Patented June 24, 1941

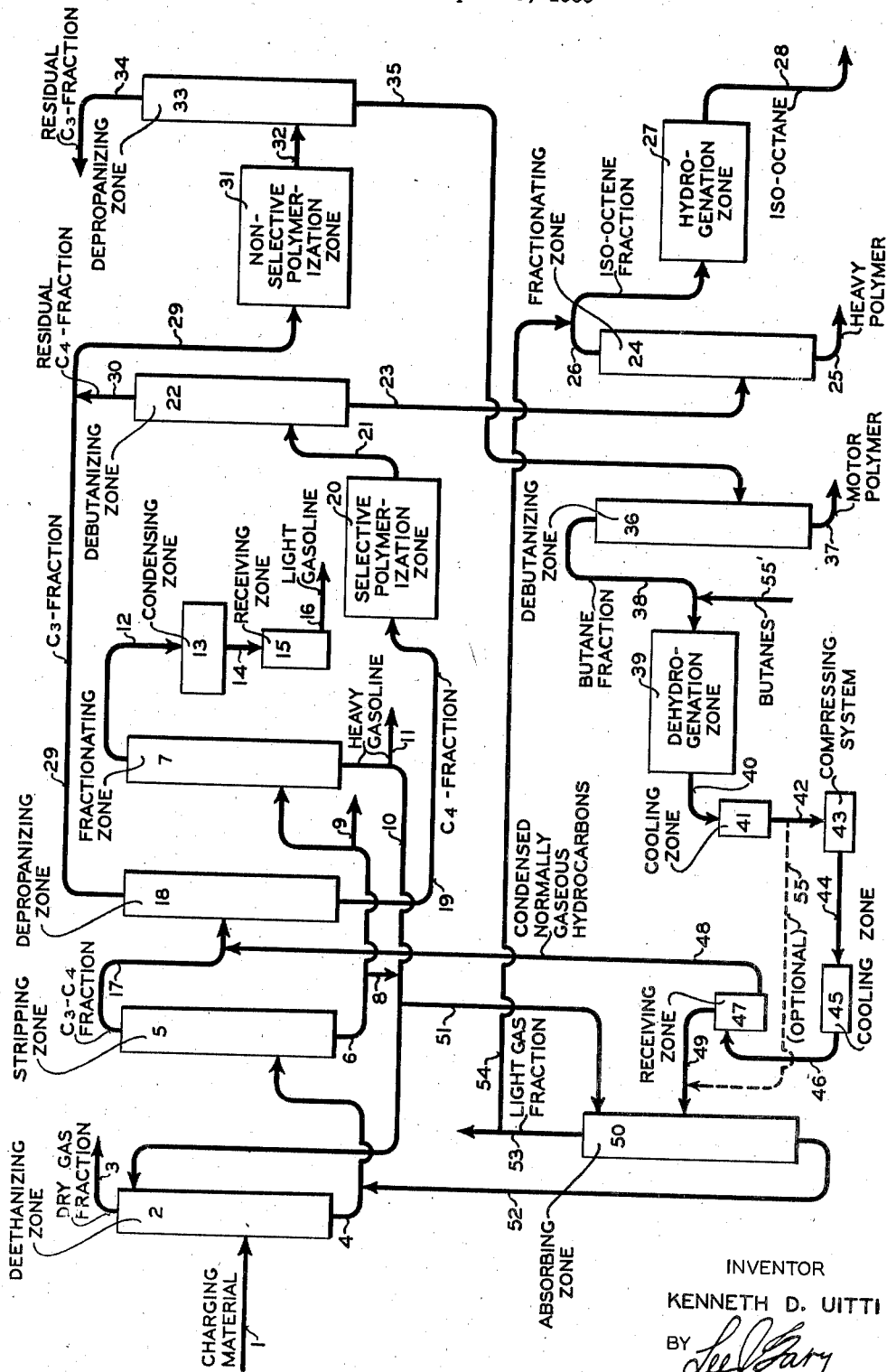

2,246,643

UNITED STATES PATENT OFFICE 2,246,643

CONCENTRATION AND CONVERSION OF HYDROCARBONS

Kenneth D. Uitti, Chicago, Ill., assignor to Universal Oil Products Company, Chicago, Ill., a corporation of Delaware Application September 30, 1939, Serial No. 297,392

4 Claims. (Cl. 196—10)

This invention relates to a process for producing both aviation and motor polymer gasolines and more specifically is concerned with a novel combination of steps wherein normally liquid hydrocarbons are separatetd from normally gaseous hydrocarbons and the polymerizable olefins contained in the latter converted into polymer gasoline and iso-octane.

The invention involves principally concentration and separation of the charging materials into light and heavy gasoline fractions, a dry gas fraction, consisting essentially of hydrogen, methane, and the $C_2$ hydrocarbons, a $C_3$ fraction and a $C_4$ fraction, selective polymerization treatment of the $C_4$ fraction to produce iso-octenes which are hydrogenated to iso-octane, non-selective polymerization treatment of the residual $C_4$ fraction from the selective polymerization treatment in commingled state with the $C_3$ fraction to produce polymer motor gasoline, dehydrogenation treatment of the butane fraction which remains after the removal of olefins from the residual $C_4$ fraction in the non-selective polymerization treatment, and separation of the light gas fraction from the dehydrogenated products which contains substantial amounts of hydrogen for use in the hydrogenation treatment.

The main purpose of this invention is to combine a gas concentration system with polymerization and dehydrogenation systems in an efficient and useful manner in order to obtain flexibility of operation with the number of fractionating and separating steps reduced to a minimum. It is not contended that any novelty resides in the individual steps of the process but rather in the novel and advantageous manner in which the various steps have been combined to produce the desired result.

In one specific embodiment the invention comprises supplying charging material comprising both normally gaseous and normally liquid hydrocarbons, the latter preferably being gasoline boiling range materials, to a deethanizing zone to separate a dry gas fraction consisting essentially of hydrogen, methane, and $C_2$ hydrocarbons from the liquid and heavier normally gaseous hydrocarbons, commingling the bottoms from said deethanizing zone with bottoms from an absorbing zone, which are formed as hereinafter described, and supplying the mixture to a stripping zone to separate substantially all of the normally gaseous hydrocarbons from the normally liquid hydrocarbons, fractionating said normally liquid hydrocarbons to separate a light gasoline from heavy gasoline and recovering the former, returning a portion of said heavy gasoline to said deethanizing zone as an absorption medium, a portion to an absorbing zone for use as hereinafter set forth, and recovering the residual portion thereof, commingling the normally gaseous hydrocarbons from said stripping zone with condensed normally gaseous hydrocarbons, formed as hereinafter described, and supplying the mixture to a depropanizing zone to separate the same into a $C_3$ fraction and a $C_4$ fraction, subjecting said $C_4$ fraction to selective polymerization treatment to polymerize a substantial portion of the olefins contained therein into iso-octenes, supplying the products of the selective polymerization treatment to a debutanizing zone to separate the residual $C_4$ fraction from the normally liquid polymers, fractionating said normally liquid polymers to separate the iso-octene fraction from the heavy polymers and recovering the latter, subjecting said iso-octene fraction, together with a light gas fraction, separated as hereinafter described, to hydrogenation treatment to convert the iso-octenes to iso-octane, commingling said residual $C_4$ fraction with said $C_3$ fraction and subjecting the mixture to non-selective polymerization treatment to polymerize substantially all of the butenes and a substantial portion of the propylene into gasoline boiling range polymers, supplying the products of said non-selective polymerization treatment to a depropanizing zone to separate a residual $C_3$ fraction from the non-selective polymers and the remaining $C_4$ hydrocarbons, recovering said residual $C_3$ fraction, supplying the mixture of non-selective polymers and $C_4$ hydrocarbons to a debutanizing zone to separate a butane fraction from the non-selective polymers and recovering the latter, subjecting said butane fraction to dehydrogenation treatment, cooling and compressing the dehydrogenated products and supplying the cooled material to a receiving zone to separate condensed normally gaseous hydrocarbons from the uncondensed hydrocarbons, supplying the former to the first mentioned depropanizing zone, supplying said uncondensed hydrocarbons to an absorbing zone to separate a light gas fraction, consisting of hydrogen, methane, and $C_2$ hydrocarbons, which is commingled with the iso-octene fraction, as previously described, supplying the bottoms from the absorbing zone to the stripping zone in commingled state with said bottoms from the deethanizing zone for treatment as aforesaid.

The accompanying drawing illustrates diagrammatically the manner in which the process of the invention may be conducted. In order to simplify the drawing, it has been drawn up in the form of a flow diagram with specific details of each process step omitted, because the invention is not concerned with a specific apparatus in which the process may be conducted.

Referring now to the drawing, charging stock, preferably comprising gasoline and gases, such as the material obtained from the receiver of a cracking plant, is introduced from line 1 to deethanizing zone 2. The gases and gasoline may be introduced in commingled state, as above described, or, when desired, may be introduced separately, in which case, in order to obtain best results, the gaseous materials may be introduced at a higher point in zone 2 than the gasoline. Deethanizing zone 2 is preferably operated under a superatmospheric pressure ranging, for example, from 200 to 400 pounds or more per square inch and at a top temperature on the order of 80 to 140° F.

A dry gas fraction, consisting essentially of hydrogen, methane, and $C_2$ hydrocarbons, is separated from the heavier normally gaseous hydrocarbons and gasoline in zone 2, the separation being effected principally by the absorption of the heavy normally gaseous hydrocarbons and the gasoline introduced as subsequently described, although condensation may also be effected. The dry gas fraction is removed from deethanizing zone 2 by way of line 3 and is directed to further treatment or recovered as a product of the process. The heavy gasoline absorption medium containing dissolved and condensed $C_3$ and $C_4$ normally gaseous hydrocarbons and the distillate introduced to zone 2 as charging material, which may also contain some of the dissolved and condensed heavy normally gaseous hydrocarbons, are directed through line 4 to stripping zone 5.

Stripping zone 5 is preferably operated at a superatmospheric pressure on the order of 30 to 200 pounds or more per square inch and at a top temperature ranging, for example, from 80 to 200° F. and a bottom temperature ranging from 160 to 300° F. whereby to effect a separation between the normally gaseous hydrocarbons and the normally liquid hydrocarbons. The normally liquid hydrocarbons from zone 5, consisting essentially of distillate introduced as a portion of the charging stock and heavy gasoline introduced as the absorption medium to zone 2, are directed through line 6 to fractionating zone 7. Fractionating zone 7 is preferably operated at a pressure ranging, for example, from substantially atmospheric to 100 pounds or more per square inch superatmospheric to provide suitable fractionating conditions. In some cases where it is only necessary to subject the heavy gasoline to treatment, the top temperature of zone 7 may be controlled so that the light gasoline taken overhead corresponds to the material which requires no treatment, while the heavy gasoline recovered as bottoms requires some treatment in order that it may be used for motor fuel purposes. Where no treatment of the gasoline recovered is required, fractionating zone 7 may be omitted and the normally liquid hydrocarbons from zone 5 in excess of the amount returned to zone 2 as an absorption medium by way of line 8 and line 10 recovered as a product of the process by way of line 9. In the preferred embodiment, however, fractionating zone 7 is employed and the heavy gasoline separated therein removed therefrom by way of line 10 and a portion returned as the absorption medium to zone 2 and a residual portion recovered as heavy gasoline by way of line 11. Light gasoline removed as vapors from zone 7 is directed through line 12 to cooling and condensation in zone 13. Distillate from zone 13 is directed through line 14 to receiving zone 15 and recovered therefrom by way of line 16.

The heavy normally gaseous hydrocarbons, consisting essentially of $C_3$ and $C_4$ hydrocarbons separated in zone 5, are directed through line 17, commingled with condensed normally gaseous hydrocarbons, separated as subsequently described, and the mixture introduced to depropanizing zone 18. Depropanizing zone 18 is preferably operated at a superatmospheric pressure ranging, for example, from 150 to 400 pounds or more per square inch and at a top temperature of from 80 to 170° F. whereby to effect a separation by fractionation of the $C_3$ fraction from the $C_4$ fraction.

The $C_4$ fraction separated in zone 18 is directed through line 19 to selective polymerization treatment in zone 20. Polymerization in zone 20 is preferably effected over a rather narrow temperature range and at a relatively high pressure in the presence of either a phosphoric acid catalyst or sulfuric acid in order to obtain a substantial yield of iso-octenes from the iso and normal butenes.

Sulfuric acid is more selective to the polymerization of iso-butene, whereas in the presence of a phosphoric acid-containing catalyst from 1 to 1½ volumes of normal butene may be polymerized per volume of iso-butene to yield iso-octenes, which upon hydrogenation have an octane rating of approximately 95. The phosphoric acid-containing catalyst is therefore the preferred catalyst. Phosphoric acid-containing catalysts consist in general of a relatively inert and siliceous carrier, such as kieselguhr impregnated with the ortho or pyrophosphoric acid, and is preferably precalcined before using. Polymerizing temperatures in the range of 250 to 450° F. and a superatmospheric pressure ranging, for example, from 500 to 1200 pounds or more per square inch may be employed when using the phosphoric acid-containing catalyst.

The products of the polymerization treatment in zone 20 are directed through line 21 into debutanizing zone 22, which is preferably operated at a superatmospheric pressure ranging, for example, from 30 to 200 pounds per square inch and at a top temperature of the order of 80 to 200° F. The separation of the residual $C_4$ fraction from the iso-octenes and heavier normally liquid polymers is accomplished in zone 22 by fractionation.

The iso-octenes, together with heavier normally liquid polymers, are directed from zone 22 through line 23 into fractionating zone 24, which is preferably operated at a pressure ranging, for example, from substantially atmospheric to 100 pounds or more per square inch. Separation by fractionation of the iso-octene fraction from the heavy polymers is accomplished in zone 24 and the heavy polymers recovered therefrom by way of line 25. The iso-octene fraction separated in zone 24 is directed through line 26, commingled with the light gas fraction separated as hereinafter described, which contains a high percentage of hydrogen, and the mixture introduced to hydrogenation zone 27.

Hydrogenation in zone 27 may be accomplished in the presence of a catalyst which, in the preferred embodiment of the invention, consists of nickel on relatively porous particles of a relatively inert and siliceous carrier, such as kieselguhr. The catalyst may be produced by precipitating nickel carbonate on kieselguhr, pressing into pills, drying, and reducing with hydrogen at a temperature of 750° F. However, other hydrogenating catalysts, well known in the art, such as, for example, the oxides of chromium, molybdenum, and tungsten may be employed, when desired. Temperatures ranging, for example, from 250 to 450° F. and pressures in the approximate range of 15 to 200 pounds or more per square inch may be employed when using the nickel catalyst in the hydrogenation treatment in zone 27. The iso-octane formed in zone 27, together with the unused hydrogen and gases, is directed through line 28, preferably cooled, and the gases and iso-octane separated and recovered as products of the process.

The C3 fraction separated in zone 18 is removed therefrom by way of line 29, commingled with the residual C4 fraction removed from zone 22 by way of line 30, and the mixture subjected to non-selective polymerization treatment in zone 31. The catalysts employed in zone 31 are preferably and substantially of the same composition as that employed in the polymerization treatment in zone 20 and the temperature and pressure regulated to effect substantially complete polymerization of the propene in the C3 fraction and the butenes in the residual C4 fraction. When using the phosphoric acid-containing catalyst, temperatures of the order of 250 to 500° F. and superatmospheric pressures ranging, for example, from 200 to 1500 pounds or more per square inch may be employed in zone 31.

The products of the non-selective polymerization treatment in zone 31 are directed through line 32 into depropanizing zone 33, which is preferably operated at a superatmospheric pressure ranging, for example, from 150 to 400 pounds or more per square inch. Separation of the residual C3 hydrocarbons from the C4 hydrocarbons, principally butanes and the normally liquid polymers, is accomplished in zone 33. The residual C3 fraction is removed from zone 33 by way of line 34 and recovered as a product of the process.

The liquid condensate from zone 33, comprising normally liquid polymers and butanes, is directed through line 35 into debutanizing zone 36, which is preferably operated under a superatmospheric pressure of the order of 30 to 200 pounds or more per square inch. Separation of the butane fraction from the motor polymer is accomplished in zone 36 and the motor polymer removed therefrom by way of line 37 and recovered as a product of the process.

The butane fraction separated in zone 36 is directed through line 38 to dehydrogenation treatment in zone 39 to convert a substantial portion of the paraffinic hydrocarbons into their corresponding olefinic hydrocarbon. Butanes from an outside source may be introduced to line 38 through line 55'. Dehydrogenation in zone 39 is accomplished in the presence of a catalyst mass which may consist of pellets or granules of alumina or other refractory materials composited with compounds of the elements selected from the group consisting of the elements in the left hand columns of groups 4, 5, and 6 in the periodic table. The invention, however, is not limited to the use of the catalyst mentioned above, for various other catalysts capable of promoting the desired reaction and known to those in the art may be employed within its broad scope. Dehydrogenation in zone 39, in the presence of any of the catalysts referred to above, may ordinarily be accomplished at a temperature ranging, for example, from 900 to 1200° F. and at pressures ranging from substantially atmospheric to 100 pounds or more per square inch superatmospheric.

The conversion products from zone 39, in the preferred embodiment of the invention, are subjected to cooling and compression in order to condense at least a portion of the heavy normally gaseous hydrocarbons and this may be accomplished by directing the products from zone 39 through line 40 into and through cooling zone 41, introducing the cooled products from zone 41 to compressing system 43 by way of line 42, discharging the products from compressing system 43 through line 44 into cooling zone 45 to remove the heat of compression, and thereafter supplying the cooled and condensed normally gaseous materials to receiving zone 47 by way of line 46. Separation between the condensed normally gaseous hydrocarbons and the uncondensed and undissolved gases is accomplished in zone 47 and the former directed through line 48 and commingled with the C3—C4 fraction in line 17, after which the mixture is introduced to zone 18. Undissolved and uncondensed gases collected and separated in receiving zone 47 are directed through line 49 into absorbing zone 50, for treatment as hereinafter described.

When desired, compressing system 43 may be omitted and the cooled products from zone 41 directed through optional line 55 into line 49 and thereafter introduced to absorbing zone 50. This procedure, however, necessitates the use of a relatively large absorbing zone, whereas when using compressing system 43 a relatively small absorbing zone may be employed. Absorbing zone 50 is preferably operated at a superatmospheric pressure ranging, for example, from 75 to 200 pounds or more per square inch and at a top temperature controlled to effect the separation between the light gases consisting essentially hydrogen, methane, and C2 hydrocarbons from the heavier gases consisting of C3 and C4 hydrocarbons. A portion of the gasoline removed from zone 7 by way of line 10 is directed through line 51 into absorbing zone 50 for use in absorbing the heavier normally gaseous hydrocarbons. The gases introduced to zone 50 by way of line 49 in ascending therein are contacted with the heavy gasoline whereby a separation is effected between the light gases and the heavier normally gaseous hydrocarbons. The latter are removed from zone 50 by way of line 52, commingled with the bottoms from zone 2, and the mixture thereafter supplied to zone 5 for treatment as previously described. The light gas fraction separated in zone 50 is removed therefrom by way of line 53 and a portion or all directed through line 54 and commingled with the iso-octene fraction in line 26, as previously described, and the residual portion, if any remains, recovered as a product of the process.

An example of one specific operation of the process is substantially as follows:

The charging material was composed of 74.8% by weight of normally liquid hydrocarbons boiling below 400° F. and 25.2% of gaseous material. The analysis of the gaseous material based on complete separation from the gasoline was as follows:

| | Mol per cent |
|---|---|
| Hydrogen | 4.4 |
| Methane | 19.5 |
| Ethylene | 2.6 |
| Ethane | 18.5 |
| Propylene | 10.5 |
| Propane | 22.4 |
| Iso-butene | 2.7 |
| Normal butenes | 7.6 |
| Iso-butane | 2.9 |
| Normal butane | 8.9 |

The charging material was introduced to the deethanizing zone which was operated at a superatmospheric pressure of 300 pounds per square inch and a top temperature of 105° F. The gaseous materials were contacted in this zone with a heavy gasoline separated as subsequently described, in order to effect a separation of the lighter gases comprising hydrogen, methane, and $C_2$ hydrocarbons from the heavier normally gaseous hydrocarbons by absorption and condensation of the latter. The light gas fraction separated in this zone and corresponding to approximately 6.6% by weight of the charge was recovered as a product of the process.

The bottoms from the deethanizing zone were introduced to a stripping zone operated at a superatmospheric pressure of 650 pounds per square inch and a top temperature of approximately 140° F. to separate the heavy normally gaseous hydrocarbons from the normally liquid hydrocarbon charge and heavy gasoline absorption oil. The bottoms from the stripping zone were supplied to a fractionator operated at substantially atmospheric pressure and a top temperature of approximately 300° F. to separate the light gasoline fraction having a 300° F. end boiling point from the heavy gasoline fraction. The former, corresponding to approximately 49% by weight of the charge, was recovered as a product of the process. A portion of the heavy gasoline recovered as condensate in the fractionating step was returned to the deethanizing zone for use as previously described, a portion was supplied to an absorbing zone for use as subsequently described, and the residual portion corresponding to approximately 25.8% by weight of the charge was recovered as a product of the process. Both the heavy and light gasolines were later blended with sufficient butanes introduced from an outside source to meet vapor pressure requirements.

The heavy normally gaseous hydrocarbons separated in the stripping zone and comprising principally $C_3$ and $C_4$ hydrocarbons were supplied to a depropanizing zone operated at a superatmospheric pressure of 275 pounds per square inch and a top temperature of 120° F. to separate the $C_3$ fraction from the $C_4$ fraction. The $C_4$ fraction was subjected to selective polymerization treatment in the presence of a phosphoric acid-containing catalyst at a temperature of 300° F. and a pressure of 1000 pounds per square inch to convert a substantial portion of the butenes to iso-octenes. The products of the selective polymerization treatment were supplied to a debutanizer operated at a superatmospheric pressure of 60 pounds per square inch and a top temperature of 130° F. to separate the residual $C_4$ fraction from the iso-octenes and heavier liquid polymers. The iso-octenes and heavy polymers from the debutanizing zone were supplied to a fractionating zone operated at a superatmospheric pressure of 5 pounds per square inch and a top temperature of 250° F. to separate the iso-octenes from the heavier polymers and the latter corresponding to approximately 0.4% by weight of the charge was recovered as a product of the process. The iso-octene fraction was subjected to hydrogenation in the presence of a nickel catalyst at a pressure of 25 pounds per square inch and a temperature of 340° F. using hydrogen formed in the process, as subsequently described. Iso-octane corresponding to approximately 2.9% by weight of the charge was recovered as a product of the process from this step.

The $C_3$ fraction separated as previously described, is commingled with the residual $C_4$ fraction also separated as previously described, and the mixture subjected to non-selective polymerization treatment in the presence of a phosphoric acid-containing catalyst at a temperature of 460° F. and a superatmospheric pressure of 1000 pounds per square inch. The products of the non-selective polymerization treatment were supplied to a depropanizing zone operated at a superatmospheric pressure of 275 pounds per square inch and a top temperature of 120° F. to separate the residual $C_3$ fraction from the heavier hydrocarbons comprising normally liquid polymers and butanes. The residual $C_3$ fraction separated in this step, corresponding to approximately 7.4% by weight of the charge was recovered as a product of the process.

The heavier hydrocarbons separated in the last mentioned depropanizing zone were supplied to a debutanizing zone operated at a superatmospheric pressure of 60 pounds per square inch and a top temperature of 130° F. to separate a butane fraction from the normally liquid polymers and the latter corresponding to approximately 6.1% by weight of the charge was recovered as a product of the process. The butane fraction was subjected to dehydrogenation treatment in the presence of an alumina-chromia catalyst at a temperature of 1100° F. and a superatmospheric pressure of 5 pounds per square inch to effect substantial conversion of the paraffins to olefins. The products of the dehydrogenation treatment were supplied to an absorbing zone operated at a superatmospheric pressure of 150 pounds per square inch and a top temperature of 105° F. and were contacted therein with heavy gasoline supplied as previously described, whereby to separate a light gas fraction consisting essentially of hydrogen from the heavier normally gaseous hydrocarbons by absorption of the latter and said heavy gasoline. The light gas fraction was commingled with the iso-octene fraction for use in the hydrogenation treatment, as previously described. The bottoms from the absorbing zone were supplied to the stripping zone and subjected to treatment therein in commingled state with the bottoms from the deethanizing zone.

I claim as my invention:

1. A process for treating the gases and gasoline produced in hydrocarbon oil conversion, which comprises deethanizing the gases and gasoline while scrubbing the former with absorber oil comprising gasoline fractions to absorb $C_3$ and $C_4$ components of the gases in the oil, stripping the resultant gas-containing liquid to remove normally gaseous hydrocarbons therefrom, thereby forming a substantially gas-free liquid, supplying a portion of the latter to the deethanizing step as absorber oil therein, subjecting at least a portion of said normally gaseous hydrocarbons to polymerization, subjecting residual paraffin gases from the polymerizing step to dehydrogenation, scrubbing gaseous products of the dehydrogenation with another portion of said gas-free liquid to absorb in the latter components of said gaseous products, and supplying the thus enriched liquid to the aforesaid stripping step.

2. A process for treating the gases and gasoline produced in hydrocarbon oil conversion, which comprises deethanizing the gases and gasoline while scrubbing the former with absorber oil comprising gasoline fractions to absorb $C_3$ and $C_4$ components of the gases in the oil, stripping the resultant gas-containing liquid to remove normally gaseous hydrocarbons therefrom, thereby forming a substantially gas-free liquid, supplying a portion of the latter to the deethanizing step as absorber oil therein, subjecting at least a portion of said normally gaseous hydrocarbons to polymerization, subjecting residual paraffin gases from the polymerizing step to dehydrogenation, cooling the gaseous products of the dehydrogenation to separate a portion of their $C_3$ and $C_4$ components and combining these components with said normally gaseous hydrocarbons liberated in the stripping step, scrubbing the remainder of said gaseous products with another portion of said gas-free liquid to absorb in the latter components of said remainder of the gaseous dehydrogenation products, and supplying the thus enriched liquid to said stripping step.

3. A process for treating the gases and gasoline produced in hydrocarbon oil conversion, which comprises deethanizing the gases and gasoline while scrubbing the former with a heavy gasoline condensate to absorb $C_3$ and $C_4$ components of the gases in said condensate, stripping the resultant gas-containing gasoline mixture to remove normally gaseous hydrocarbons therefrom, fractionating the stripped gasoline to separate the same into a light gasoline fraction and a heavy gasoline fraction, supplying a portion of the latter to the de-ethanizing step as absorber oil therein, subjecting at least a portion of said normally gaseous hydrocarbons to polymerization, subjecting residual paraffin gases from the polymerizing step to dehydrogenation, scrubbing gaseous products of the dehydrogenation with another portion of said heavy gasoline fraction to absorb in the latter components of these gaseous products, and supplying the thus enriched heavy gasoline fraction to the aforesaid tripping step.

4. A process for treating the gases and gasoline produced in hydrocarbon oil conversion, which comprises de-ethanizing the gases and gasoline while scrubbing the former with a heavy gasoline condensate to absorb $C_3$ and $C_4$ components of the gases in said condensate, stripping the resultant gas-containing gasoline mixture to remove normally gaseous hydrocarbons therefrom, fractionating the stripped gasoline to separate the same into a light gasoline fraction and a heavy gasoline fraction, supplying a portion of the latter to the de-ethanizing step as absorber oil therein, subjecting at least a portion of said normally gaseous hydrocarbons to polymerization, subjecting residual paraffin gases from the polymerizing step to dehydrogenation, cooling the gaseous products of the dehydrogenation to separate a portion of their $C_3$ and $C_4$ components and combining these components with said normally gaseous hydrocarbons liberated in the stripping step, scrubbing the remainder of said gaseous products with another portion of said heavy gasoline fraction to absorb in the latter components of these gaseous products, and supplying the thus enriched heavy gasoline fraction to the aforesaid stripping step.

KENNETH D. UITTI.